Figure 1:
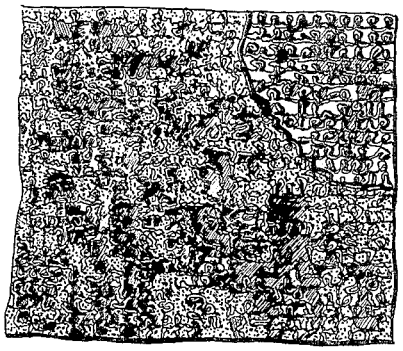

Jan. 2, 1934.  D. REPONY  1,941,912
NONSLIPPING SURFACE AND METHOD OF MAKING THE SAME

Filed Jan. 8, 1932

INVENTOR
DANIEL REPONY
BY HIS ATTORNEYS

Patented Jan. 2, 1934

1,941,912

UNITED STATES PATENT OFFICE 1,941,912

NONSLIPPING SURFACE AND METHOD OF MAKING THE SAME

Daniel Repony, Clifton, N. J., assignor to Raybestos-Manhattan, Inc., Passaic, N. J., a corporation of New Jersey Application January 8, 1932. Serial No. 585,448

9 Claims. (Cl. 154—2)

This invention relates to an article having a rough surface particularly adapted to serve as a non-slipping friction surface, e. g., for conveyor belts, rugs, shoe soles, massage devices and other friction articles. The invention also includes the method of manufacturing such articles.

Prior to my invention, rubber has been used in numerous applications for producing a non-slipping surface for frictional engagement under many and varied conditions. Various expedients have been resorted to for the purpose of providing a more effective engagement of the rubber with a surface or article which it is intended to bear against. Thus the rubber at the surface has been corrugated or molded into pyramids, given the impression of a coarse fabric, or molded into other more or less irregular shape, or crepe rubber, bearing the irregular corrugations commonly produced by the creping rolls, has been used either in the unvulcanized state or after vulcanization. All of these expedients involve the use of a relatively thick surface coating of rubber and either a molding or a creping operation. Furthermore, it would be difficult with any of these expedients to reenforce the surface rubber by means of textile thread or fabric.

According to my invention I am able to produce a reenforced, irregular rubber friction surface which is both cheaper to manufacture, more resisting to wear and more satisfactory in use. I accomplish this by applying rubber or other friction coating material to the fibers of a nap fabric in such manner that the character of the nap as such is preserved, the fibers or threads thereof being kept at least partially separate and being prevented from being cemented completely to each other or to the base. While I have found rubber to produce the most satisfactory effect when coated on a nap fabric, there are nevertheless many other materials which may be similarly used. Thus flexible gums, varnishes, resins, siccative oils and others may be used to coat and impregnate the nap.

The article of my invention may be made by first producing the fabric such as terry cloth, or any other fabric having a nap or loose threads or fibers projecting from its surface, and thereafter treating such nap with the coating material so that the threads or fibers of the nap are coated at least on their ends with such material. The nap is combed or brushed out away from the base fabric either before or after the coating treatment, or both, in order to prevent its being secured to the base by the cementing action of the coating material. In some cases it may also be necessary or desirable to comb or otherwise to separate the threads or fibers of the nap during the drying or curing treatment by which the coating material is fixed thereon. Or the surface may be combed up after such fixing treatment if the coating material is such that it may be broken between the threads or fibers of the nap without objectionable injury to the nap itself. If, however, the nap has not been matted during or prior to the coating step such brushing or equivalent treatment will, of course, be unnecessary.

If the friction surface is to be used upon a base of some other material, as is frequently the case, e. g., in the case of shoe soles, conveyor belts, etc., the base fabric on which the nap is carried may be secured to the other material either before or after the treatment of the nap. Where no other base material is needed, the base of the nap fabric may be treated on the back as well as on the face with a coating material such as rubber, etc.

In the accompanying drawing I have illustrated a preferred embodiment of my invention.

Figure 2:

Fig. 1 is a top view of an article made according to my invention, showing in one corner a portion of the surface before applying the coating material, and Fig. 2 is a cross section of a conveyor belt made according to my invention.

The embodiment illustrated in the drawing is a conveyor belt to be used, for example, for carrying small packages or other light articles. In this case, the belt may be constructed like any other conveyor belt, for example, a number of plies, 10, of canvas fabric coated or "frictioned" with rubber and a surface ply, 11, of terry cloth. These plies are vulcanized together into a belt in the usual manner and thereafter the nap of the terry cloth facing is coated with rubber, advantageously by spraying, brushing or flowing a thin layer of latex or artificially dispersed rubber. For this purpose, I prefer to use a prevulcanized rubber latex, e. g., such as is described in the Patent No. 1,682,857, granted to Philip Schidrowitz. During or after the drying of the coating, the nap of the terry cloth is again combed out away from the base. After the coating material is dry, and if a prevulcanized coating material has not been used, it is preferably subjected to a vulcanization, or fixing treatment. If the vulcanizing ingredients have been included in the coating material, a heat treatment may be used satisfactorily and in this case the entire belt may be vulcanized at the same time, i. e., the coating of terry cloth may take place before the vulcanization of the rest of the belt. In other cases, a surface vulcanization, such as treatment with sulphur dioxide and hydrogen sulfide (as in the Peachey process) or a treatment with sulphur chloride, or the surface may be brushed with sulphur and a very active ultra accelerator, either in powdered form or in solution, after which the vulcanization may take place either at room temperature or by heating, according to the type of accelerator which is used.

With coating materials other than rubber, the fixing treatment will, of course, be varied to suit the particular material and may be a mere heat treatment or an oxidation or merely an evaporation of solvent or dispersing liquid.

Instead of applying the coating material in liquid form, it may be applied in dough or plastic form, e. g., by a spreading or friction calendering process. In such case, however, it will ordinarily be more difficult to raise and separate the nap after the coating material is applied.

Due to the peculiar surface characteristics of the material of my invention, it is peculiarly adapted to many uses where more expensive materials heretofore have been required. Conveyor belts, shoe soles, rugs, and massaging devices have already been suggested. Practice putting greens for golf, "rubber sandpaper" for take-up rolls on looms, and non-slip backing for rugs or mats, are other uses for which the material of my invention is especially adapted. The non-slip surface of my invention may also be used as the driving surface of a belt, that is, the surface which is to engage the pulley, or other driving member. In this connection, reference is made to my co-pending application filed herewith. Numerous other uses will suggest themselves to anyone familiar with the use of non-slipping materials and devices.

I claim:

1. An article of manufacture having a rough surface which comprises a textile fabric having a nap and a base and a flexible coating material covering at least the ends of the threads of said nap without destroying the character of the nap as such and leaving said threads or groups of threads separate and upstanding from the base.

2. An article of manufacture having a rough surface which comprises a fabric having a fibrous nap and a flexible coating material separately covering and anchored to upstanding threads or groups of threads thereof, whereby the character of said nap as such is maintained but its frictional quality is substantially increased.

3. An article as described in claim 2 in which the coating material is rubber.

4. An article as described in claim 2 in which the nap consists of soft loops of the thread which forms the base fabric and the coating material serves to stiffen these loops and to hold them in upstanding position.

5. A conveyor belt comprising a plurality of plies of textile fabric secured together, the outer ply having a nap thereon and said nap being coated with a flexible friction material but retaining its character as a nap composed of separate outstanding projections.

6. A rug comprising a base fabric and a nap upstanding therefrom, separate threads or groups of threads of said nap being coated with a flexible friction surface material.

7. A method of making a friction article which comprises forming a nap upon a base fabric, coating said nap with a friction surface material and separating the threads of said nap after the coating material is applied thereto.

8. The process as defined in claim 7 in which the nap is coated with a colloidal dispersion of rubber and is thereafter combed to cause the threads thereof to be separated and to stand out from the base fabric before said rubber dispersion has dried.

9. The process as defined in claim 7 in which the coating material is a vulcanized rubber dispersion and threads of the nap are separated and caused to stand out from the base fabric before the dispersion has dried.

DANIEL REPONY.